(12) United States Patent
Niitsuma et al.

(10) Patent No.: US 10,470,449 B1
(45) Date of Patent: Nov. 12, 2019

(54) DUAL-BEARING REEL

(71) Applicants: Akira Niitsuma, Osaka (JP); Akira Nago, Osaka (JP)

(72) Inventors: Akira Niitsuma, Osaka (JP); Akira Nago, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/413,164

(22) Filed: May 15, 2019

(30) Foreign Application Priority Data

Jul. 13, 2018 (JP) ................................ 2018-133579

(51) Int. Cl.
    *A01K 89/01*     (2006.01)
    *A01K 89/033*     (2006.01)

(52) U.S. Cl.
    CPC .... *A01K 89/052* (2015.05); *A01K 89/011223* (2015.05)

(58) Field of Classification Search
    CPC ............................................... A01K 89/01555
    See application file for complete search history.

(56) References Cited

U.S. PATENT DOCUMENTS

| | | | | |
|---|---|---|---|---|
| 5,950,949 A * | 9/1999 | Cockerham | ........ | A01K 89/0155 242/289 |
| 5,984,221 A * | 11/1999 | Kim | ...................... | A01K 89/033 242/289 |
| 6,003,798 A * | 12/1999 | Kim | .................... | A01K 89/0155 242/289 |
| 6,206,311 B1 * | 3/2001 | Kim | .................... | A01K 89/0155 242/288 |
| 8,899,505 B2 * | 12/2014 | Sim | ........................ | A01K 89/02 242/288 |
| 2012/0056029 A1 * | 3/2012 | Sim | .................... | A01K 89/0155 242/273 |

FOREIGN PATENT DOCUMENTS

JP      2005-211054 A     8/2005

* cited by examiner

*Primary Examiner* — Emmanuel M Marcelo
(74) *Attorney, Agent, or Firm* — Global IP Counselors, LLP

(57) ABSTRACT

A dual-bearing reel includes a brake that brakes a spool, and a mode selector that selects a braking mode according to a rotational position of an operating element. The operating element is supported by a support shaft, which is biased toward one side, from a center of a major axis of a projection of the operating element in the axial direction of the spool, so as to be turnable about a position separated from a center of an external portion on the side having an opening for attaching/detaching the spool. The angular range of the rotational position of the operating element is 90° or less on each side of a line connecting the support shaft and the center of the external portion, starting from a position in which a line extending from the support shaft toward the center of the major axis opposes the center of the external portion.

3 Claims, 6 Drawing Sheets

DUAL-BEARING REEL

CROSS-REFERENCE TO RELATED APPLICATIONS

This application claims priority to Japanese Patent Application No. 2018-133579, filed on Jul. 13, 2018. The entire disclosure of Japanese Patent Application No. 2018-133579 is hereby incorporated herein by reference.

BACKGROUND

Field of the Invention

The present invention relates to a dual-bearing reel with a braking device in which a braking mode can be selected for braking the rotation of the spool.

That is, the present invention is directed to a baitcasting reel that uses a lure and that releases a fishing line during casting, and includes a spool braking device to prevent backlash during casting. The spool braking device electronically controls and brakes the rotation of the spool in the line-feeding (casting) direction is known.

Background Art

During casting with a conventional dual-bearing reel, the timing and amount of backlash that is generated can change depending on the type of fishing line, the type of tackle that is attached to the fishing line, the direction of the wind, etc. There are conventional electronically controlled braking devices in which a plurality of braking modes can be set as a function of these characteristics, and the user is able to select the braking mode. For example, Japanese Published Unexamined Application No. 2005-211054 discloses that one out of eight braking modes can be selected according to the rotational position of a disk-like brake switching knob.

SUMMARY

In an electronically controlled braking device in which a braking mode is selected according to the rotational position of a brake switching knob, the shape of a knob body, the rotational position of which is detected, is circular and has the same shape as the brake switching knob. The brake switching knob is an operating unit that is externally exposed. Accordingly, a circular relief area is required on the frame and the reel body around the brake switching knob. In order to provide a circular range for the brake switching knob to turn, an external portions of the frame and the reel body must be increased accordingly.

Given the foregoing circumstances, an object of the present invention is to reduce the size of an external portion of the reel on the side of an operating element for selecting the braking mode in a dual-bearing reel.

A dual-bearing reel according to an aspect of the present invention comprises a spool around which a fishing line is wound, a reel body rotatably supporting the spool and having an opening side in which an opening is formed through which the spool can pass in the direction of the axis of rotation of the spool, a spool support portion detachably coupled to the opening side of the reel body and supporting a shaft of the spool on the opening side, a braking device that brakes the rotation of the spool, and a mode selection unit disposed on the spool support portion and that selects a braking mode of the braking device as a function of the rotational position of an operating element. The operating element is supported by a support shaft, which is biased toward one side, from a center of a major axis of a projection of the operating element in an axial direction of the spool, so as to be turnable about a position separated from a center of an external portion on the opening side of the reel body, around a rotational axis of the spool. The angular range of the rotational position for selecting the braking mode of the operating element is 90° or less on each side of a line connecting the support shaft and the center of the external portion, starting from a position in which a line extending from the support shaft toward the center of the major axis opposes the center of the external portion of the reel body.

Preferably, the operating element includes a support shaft, a knob that is coupled to the support shaft, and a selection element that opposes the knob, spaced apart in the direction of the support shaft, and that is connected to the support shaft. The support shaft is turnably supported by the spool support portion between the knob and the selection element.

Preferably, the mode selection unit has a dial plate that is connected to the spool support portion as a separate element from the spool support portion and that indicates the braking mode that is selected according to the rotational position of the knob, and the support shaft of the operating element is supported between the knob and the selection element by the dial plate so as to be turnable.

According to the present invention, since the operating element is supported by the support shaft, which is biased toward one side, from the center of the major axis of the projection of the operating element in the axial direction of the spool, so as to be turnable, and the angular range of the rotational position for selecting the braking mode is 90° or less on each side of the line that connects the support shaft and the center of the external portion, starting from the position in which the line extending from the support shaft toward the center of the major axis opposes the center of the external portion of the reel body, it is possible to reduce the size of an external portion of the reel on the side of the operating element.

DETAILED DESCRIPTION OF THE EMBODIMENT

Figure 1:
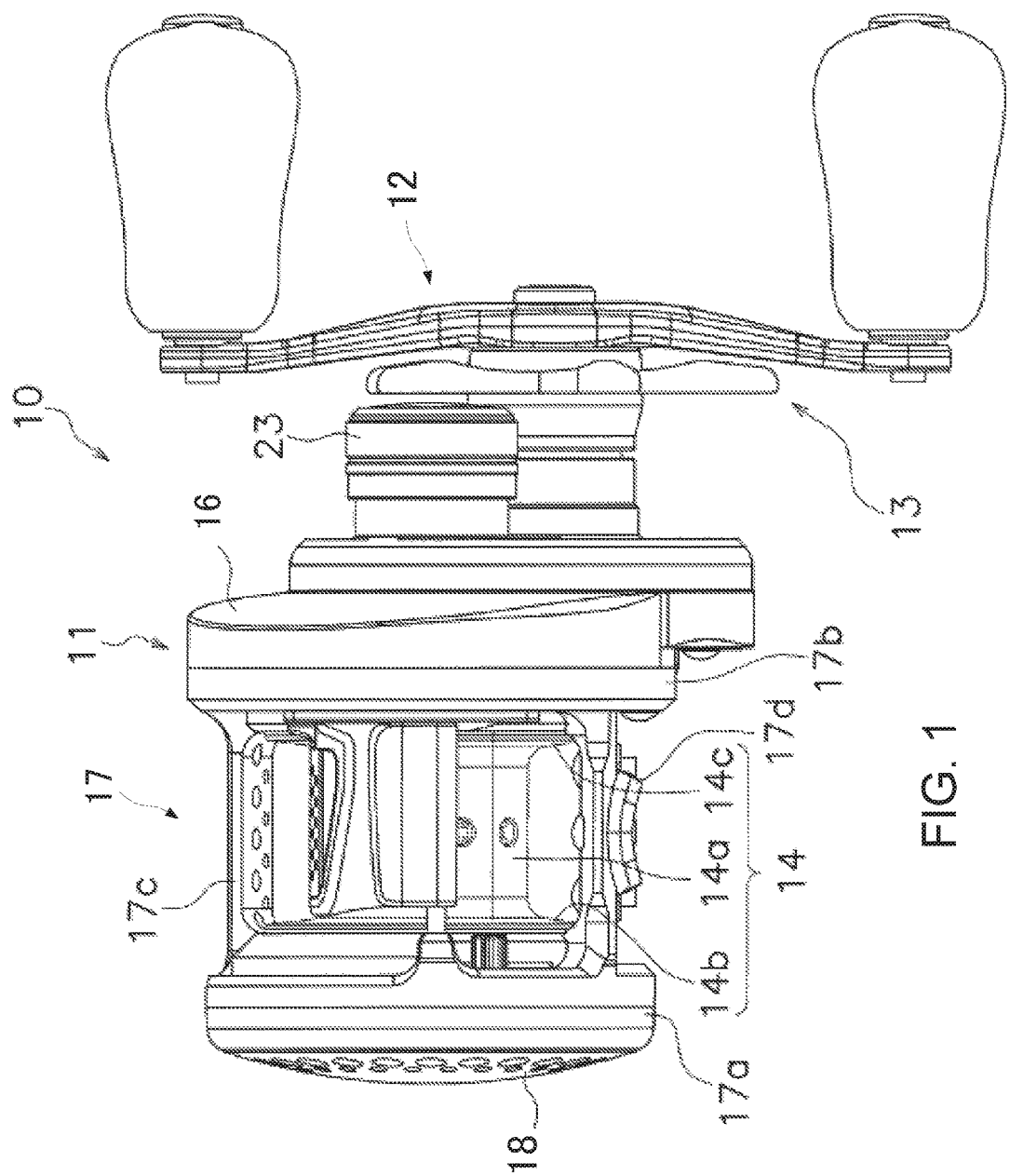
FIG. 1 is a front view of a dual-bearing reel according to an embodiment of the present invention.

An embodiment of the present invention will be described in detail below, with reference to the drawings. Portions that are the same as or equivalent have been assigned the same reference numerals.

FIG. 1 is a front view of a dual-bearing reel according to an embodiment of the present invention. FIG. 1 is a view of the dual-bearing reel 10 mounted on a fishing rod, as seen from the back end of the fishing rod. The dual-bearing reel 10 comprises a reel body 11 that is mounted on a fishing rod, a spool 14 that is rotatably supported by the reel body 11 and around which a fishing line is wound, a handle 12 for rotating the spool 14, a resistance operating unit 23 for adjusting a casting control mechanism, and a star drag 13 for adjusting the drag.

The reel body 11 includes a frame 17 composed of a first side plate 17a, a second side plate 17b, a connecting portion 17c, and a fishing rod mounting portion 17d. The reel body 11 includes a cover 18 on a side of the frame 17 to/from which the spool 14 is attached/detached, and a drive mechanism housing part 16 that covers the handle 12 side. The spool 14 has a bobbin trunk 14a around which the fishing line is wound, and a first flange portion 14b and a second flange portion 14c, forming a left-right pair having a large diameter at two ends of the bobbin trunk 14a. The first flange portion 14b is disposed on the opposite side of the handle 12 and the second flange portion 14c is disposed on the handle 12 side.

Figure 2:
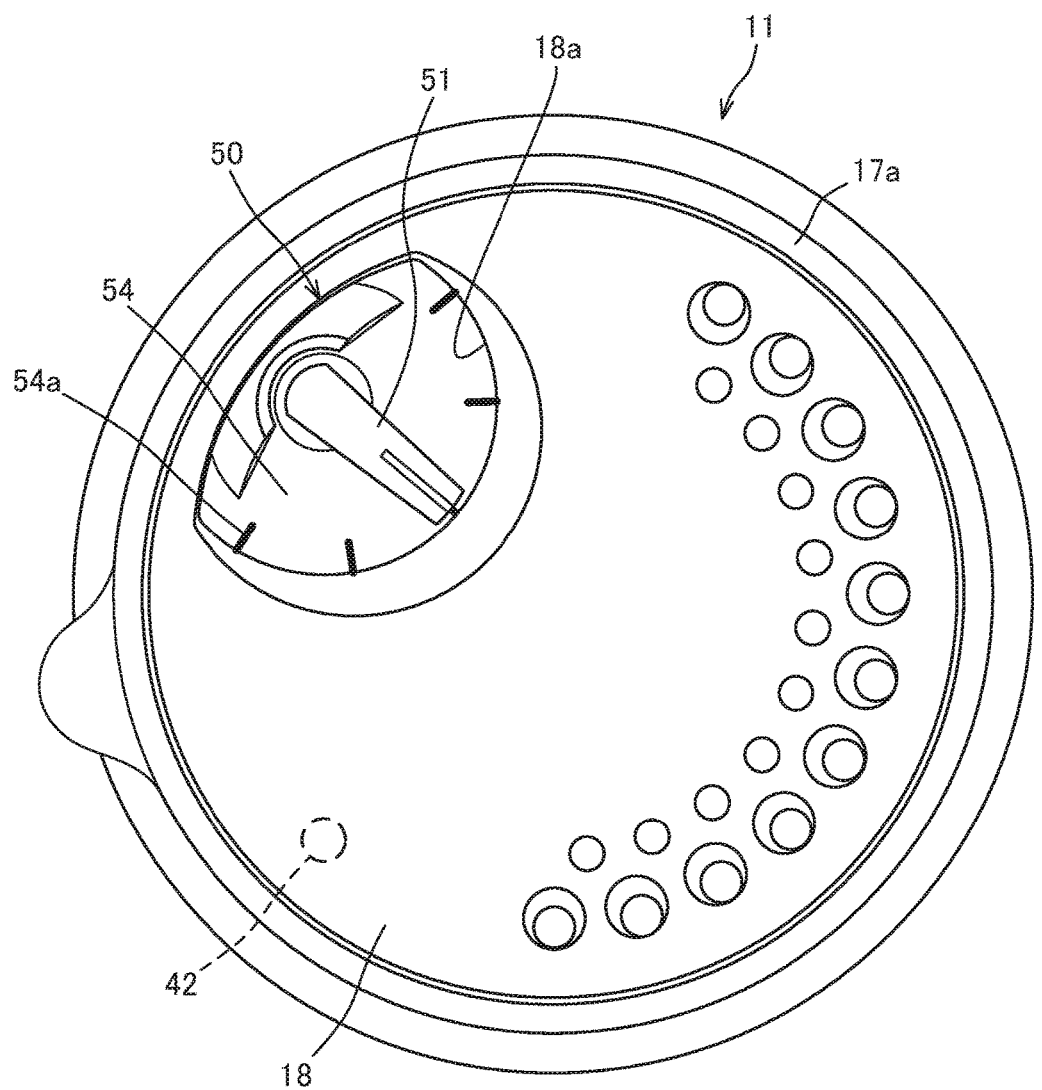
FIG. 2 is a side view of the dual-bearing reel according to this embodiment.

FIG. 2 is a side view of the dual-bearing reel according to this embodiment. FIG. 2 is a view of the dual-bearing reel as seen from the side of the cover 18. In FIG. 2, the handle 12, the fishing rod mounting portion 17d, and the drive mechanism housing part 16 are not shown. A window 18a for exposing a dial plate 54 of a mode selection unit (mode selector) 50 for selecting a braking mode of a braking device (brake) disposed inside the reel body 11 is formed on the cover 18, and the dial plate 54 and a knob 51 can be seen therethrough. The braking device brakes the rotation of the spool 14 in the line-feeding direction. It is possible to select one from among a plurality of braking modes by turning the knob 51 of the mode selection unit 50 and aligning the knob with the position of one of the dial marks 54a. In this embodiment, five braking modes are set. In FIG. 2, the knob 51 is aligned with the central rotational position of the five modes.

Figure 3:
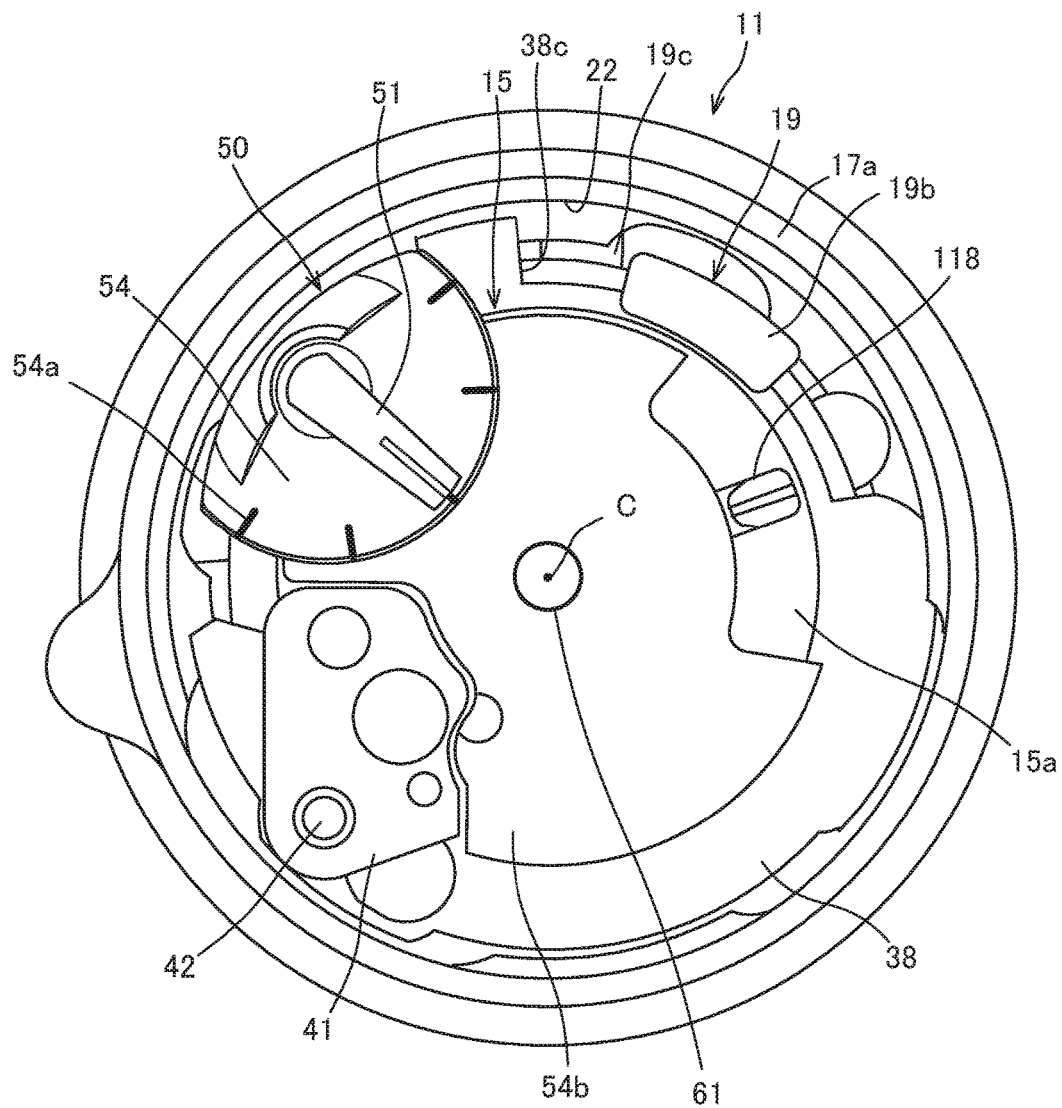
FIG. 3 is a side view of the dual-bearing reel according to this embodiment, excluding a cover.

The cover 18 can be pulled out from the reel body 11 in the axial direction of the spool 14 and opened by being pivoted about a second connecting part 42 inside the reel body 11. FIG. 3 shows a side view of the dual-bearing reel according to this embodiment without the cover. Although the cover 18 has been omitted in FIG. 3, the cover 18 is pivotably supported with the second connecting part 42 as the fulcrum. The outer periphery of the first side plate 17a is the external portion of the reel body 11, on the side where an opening for attaching/detaching the spool 14 is formed around the rotational axis of the spool 14. The first side plate 17a is circular. An opening 22 through which the spool 14 can pass in the axial direction is formed in the first side plate 17a.

A spool support portion (spool support) 15, an attaching/detaching part 19, and a locking element 38 are disposed on the inner peripheral portion of the first side plate 17a of the frame 17. The attaching/detaching part 19 and the locking element 38 have an annular shape and are pivotably connected to the outer periphery of a cylindrical substrate housing portion 15a that is formed in the spool support portion 15. An operating knob 19b on the attaching/detaching part 19 is disposed in a notched portion 38c that is disposed in the outer periphery of the locking element 38. In the attaching/detaching part 19, a bayonet protrusion 19c on the outer periphery thereof engages a bayonet groove, not shown, disposed on the first side plate 17a, to thereby connect the spool support portion 15 to the first side plate 17a. The spool support portion 15 can be attached to/detached from the first side plate 17a by operating the operating knob 19b formed in the attaching/detaching part 19 to pivot the attaching/detaching part 19.

A first connecting part 41 for connecting the cover 18 is connected to the spool support portion 15. A second connecting part 42 is supported by the first connecting part 41 so as to be slidable in the axial direction. The second connecting part 42 has a stepped cylindrical shape, and the cover 18 is connected to the distal end thereof.

A brake adjustment part 118 for adjusting the braking force of the braking device is supported by the spool support portion 15. The brake adjustment part 118 can be turned about the center of the spool support portion 15.

The spool support portion 15 includes the mode selection unit 50 for selecting the braking mode of the braking device according to the rotational position of the knob 51. The mode selection unit 50 includes the dial plate 54 and the knob 51. A support plate 54b, which is connected to the spool support portion 15, is integrally formed with the dial plate 54. The dial plate 54 is connected to the spool support portion 15 by a screw 61. The screw 61 for connecting the dial plate 54 to the spool support portion 15 is positioned at the center C of the first side plate 17a. The knob 51 is supported by the dial plate 54 so as to be turnable about a support shaft to which the knob 51 is coupled. Dial marks 54a that indicated the selected position of the braking mode are formed on the dial plate 54.

Figure 4:
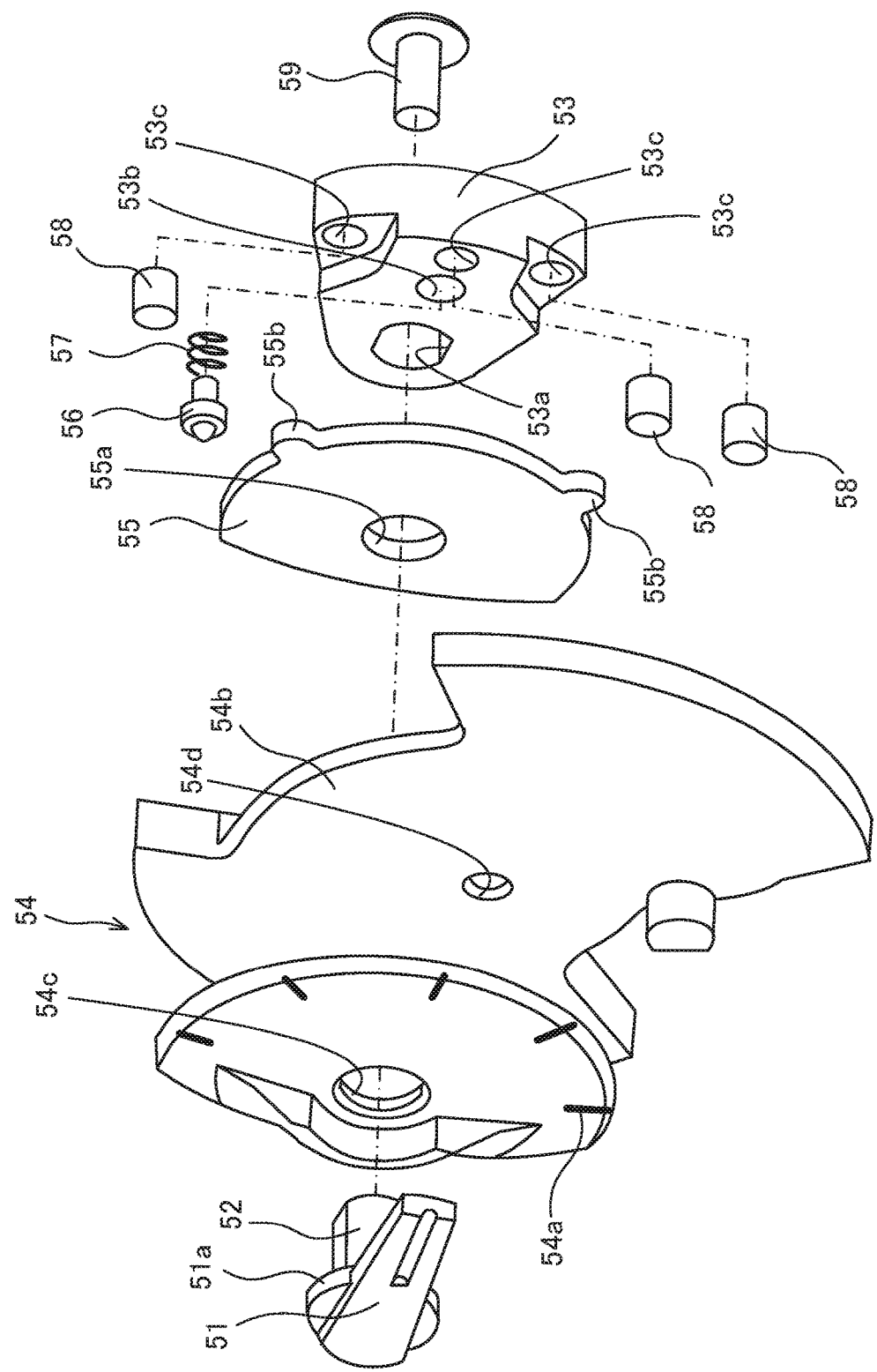
FIG. 4 is an exploded perspective view of a mode selection unit of the dual-bearing reel according to this embodiment.

FIG. 4 is an exploded perspective view of the mode selection unit of the dual-bearing reel according to the embodiment. The mode selection unit 50 includes the knob 51 coupled to a support shaft 52, the dial plate 54, a sound generation plate 55, and a selection element 53. Three retention holes 53c, into which are inserted magnets 58 and a housing hole 53b for accommodating a positioning part 56 are disposed in the selection element 53. A magnet 58 is inserted and fixed into each of the three retention holes 53c of the selection element 53. The positioning part 56 is accommodated in the housing hole 53b to be slidable. A spring 57 that applies a biasing force in a direction away from the housing hole 53b is connected to the positioning part 56.

A support hole 54c, in which the support shaft 52 of the knob 51 is turnably inserted, is disposed in the dial plate 54. A shaft hole 55a, into which the support shaft 52 is turnably inserted, is disposed in the sound generation plate 55. A protrusion 55b that engages a recess on the rear surface of the dial plate 54 is formed on the outer periphery of the sound generation plate 55. The protrusion 55b of the sound generation plate 55 engages the recess of the dial plate 54 to prevent the sound generation plate 55 from rotating relative to the dial plate 54.

Two opposing, axis-parallel flat surfaces are disposed on the cylindrical surface of the support shaft 52 to serve as a rotation arrest or detent. A fixing hole 53a, in which the support shaft 52 is non-rotatably inserted, is disposed in the selection element 53. The fixing hole 53a of the selection element 53 includes opposing flat surfaces that correspond to the flat surfaces of the support shaft 52 and rotation thereof relative to the knob 51 is prevented in predetermined orientation.

The support shaft 52 passes through the support hole 54c in the dial plate 54 and the shaft hole 55a in the sound generation plate 55 and is inserted into the fixing hole 53a of the selection element 53. The selection element 53 is connected to the support shaft 52 of the knob 51 by a screw 59. The dial plate 54 and the sound generation plate 55 are sandwiched between a pedestal 51a of the knob 51 and the selection element 53. The knob 51 and the selection element 53 can be integrally turned relative to the dial plate 54 and the sound generation plate 55. The dial plate 54 is connected to the spool support portion 15 by the screw 61, which passes through a fixing hole 54d in the support plate 54b. The support shaft 52 is thus turnably supported by the dial plate 54 between the knob 51 and the selection element 53. The knob 51, the support shaft 52, and the selection element 53 form an operating element for selecting the braking mode.

Five holes, not shown, into which the distal end of the positioning part 56 can be inserted in accordance with the rotational position of the selection element 53 for selecting the braking mode, are disposed in the surface of the sound generation plate 55 that opposes the selection element 53. The knob 51 and the selection element 53 are arrested and positioned in a rotational position where the distal end of the positioning part 56 is inserted into the hole of the sound generation plate 55. When the distal end of the positioning part 56 enters a hole of the sound generation plate 55, the sound generation plate 55 is struck by the positioning part 56 due to the biasing force of the spring 57 and generates a sound.

Figure 5:
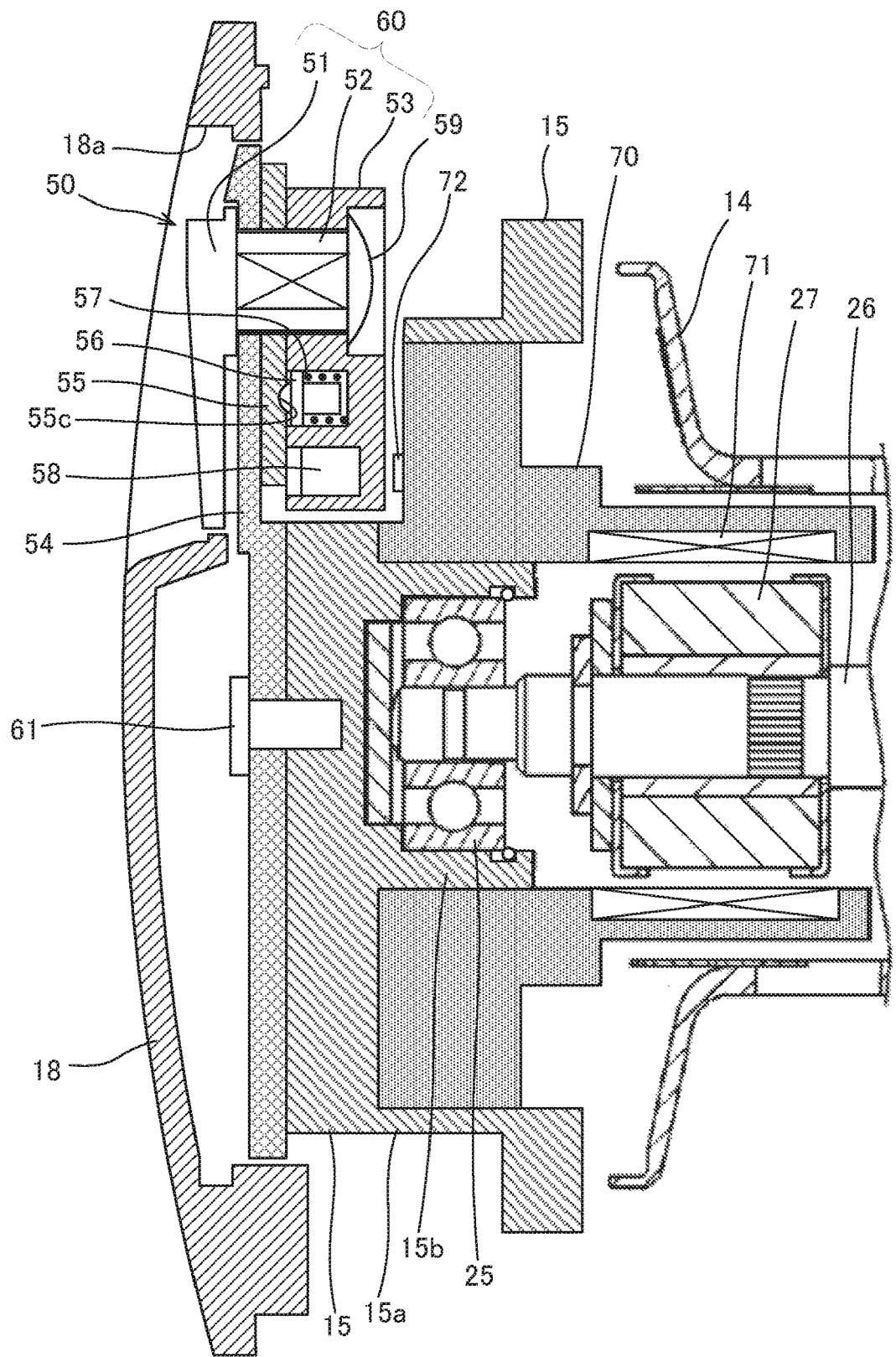
FIG. 5 is a partial perspective view of the dual-bearing reel according to this embodiment.

FIG. 5 is a partial perspective view of the dual-bearing reel according to the embodiment. FIG. 5 shows the spool support portion 15, the mode selection unit 50, the cover 18, and portions of the spool 14 and the spool shaft 26. In FIG. 5, the frame 17, the attaching/detaching part 19, and the locking element 38 are not shown.

In the spool support portion 15, a shaft bearing housing portion 15b is formed in a cylindrical shape inside the substrate housing portion 15a. The spool support portion 15 rotatably supports one end of the spool shaft 26 via a shaft bearing 25 that is housed in the shaft bearing housing portion 15b. The spool 14 and a magnet 27 are non-rotatably connected to the spool shaft 26, and the spool 14, the magnet 27, and the spool shaft 26 integrally rotate. A substrate assembly 70 is disposed around the shaft bearing housing portion 15b inside the substrate housing portion 15a of the spool support portion 15 and is held by the spool support portion 15.

The dial plate 54 of the mode selection unit 50 is connected to the cover 18 side of the spool support portion 15 by the screw 61. A protrusion is formed on either the spool support portion 15 or the dial plate 54, a recess is formed on the other element, that is, the dial plate or the spool support portion, and the protrusion and the recess are connected to each other, thereby positioning the two elements. The cover 18 covers the spool support portion 15 and the mode selection unit 50. The dial plate 54 and the knob 51 are exposed from the window 18a formed in the cover 18. The spool support portion 15, the shaft bearing 25, the substrate assembly 70, the mode selection unit 50, and the cover 18 can be integrally attached to/detached from the first side plate 17a.

As described above, the support shaft 52 of the knob 51 passes through the dial plate 54 and the sound generation plate 55, and the selection element 53 is connected to the support shaft 52 by the screw 59. Magnets 58 are held by the selection element 53. In addition, the positioning part 56 is slidably accommodated in the selection element 53. The positioning part 56 is biased toward the sound generation plate 55 by the spring 57. FIG. 5 shows a state in which the distal end of the positioning part 56 is disposed in a recess 55c formed in the sound generation plate 55. The knob 51, the support shaft 52, and the selection element 53 form an operating element 60 of the mode selection unit 50, and are integrally turned.

The substrate assembly 70 has a speed detection unit, not shown, for detecting the rotational speed of the spool 14. For example, the rotational speed is detected from a signal obtained by reading, with a sensor, light that is reflected from a pattern, which periodically changes in the direction of rotation, formed on the spool 14.

A coil 71 is mounted on a portion of the substrate assembly 70 that opposes the magnet 27. Rotation of the magnet 27 generates an electromotive force in the coil 71. The rotation of the spool 14 can be braked by connecting the terminals of the coil 71 to a resistor and supplying current to the coil 71. In the substrate assembly 70, the braking force is controlled by adjusting the timing and magnitude of the current that flows through the coil 71 with respect to the rotation of the spool 14. The magnet 27, the coil 71, and the substrate assembly 70 constitute the braking device. In the dual-bearing reel 10, a plurality of braking modes are set that have different braking force generation timings and magnitudes. In this embodiment, five braking modes are set.

An opening is disposed in a portion of the spool support portion 15 that opposes the selection element 53. The selection element 53 directly opposes the substrate assembly 70 with no intervening obstruction. A magnetic sensor 72 is mounted on a surface of the substrate assembly 70 that opposes the selection element 53. The substrate assembly 70 detects the positions of the magnets 58 held by the selection element 53 with the magnetic sensor 72 and identifies the rotational position of the selection element 53. For example, in a state in which the knob 51 is in the central rotational position of the five modes, a magnetic sensor 72 is mounted in each of the positions that respectively oppose the three magnets 58, and the rotational position of the five modes can be identified from the combination of the presence/absence of magnetic detection of the three magnetic sensors 72. Alternatively, two magnetic sensors 72 capable of detecting the direction of the magnetic field lines are disposed, and the rotational position is identified from the combination of the directions of the magnetic field lines detected by each of the magnetic sensors 72. The substrate assembly 70 controls the braking force by the braking mode corresponding to the identified rotational position of the selection element 53.

Figure 6:
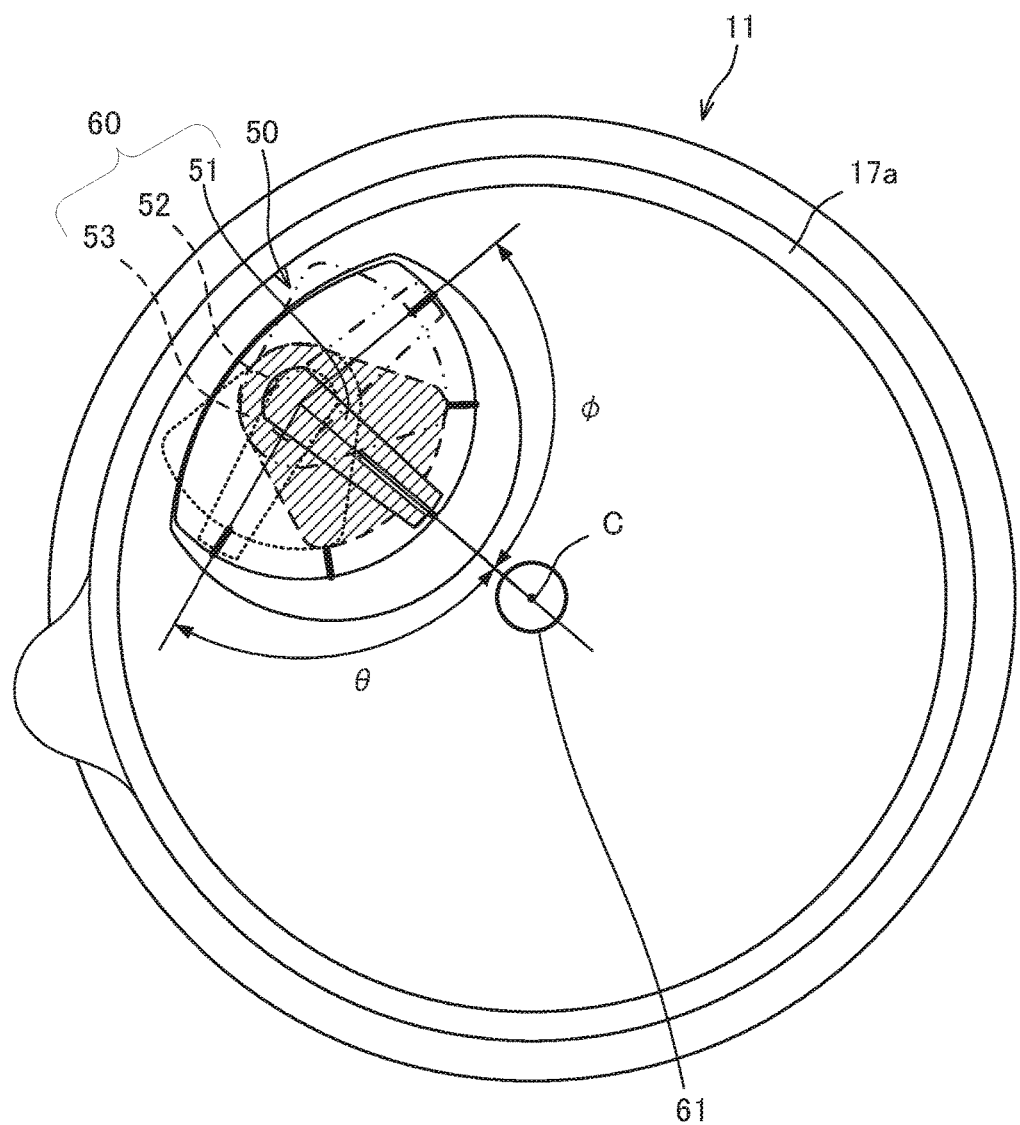
FIG. 6 is a view showing the range occupied by the turning of an operating element according to this embodiment.

FIG. 6 is a view showing the range occupied by turning the operating element according to one embodiment. As described above, the knob 51, the support shaft 52, and the selection element 53 form the operating element 60 for selecting the braking mode. In FIG. 6, the projection of the operating element 60 in the axial direction of the spool 14 when the operating element is in the central rotational position of the five modes is indicated by hatching. The operating element 60 being at the end of the turning range in the counterclockwise direction is indicated by the chain double-dashed line, and the operating element being at the end of the turning range in the clockwise direction is indicated by the dotted line.

As shown in FIGS. 3, 4, and 5, the operating element 60 is supported by the support shaft 52, which is biased toward one side, from the center of the major axis of the projection of the operating element 60 in the axial direction of the spool 14, so as to be turnable about a position separated from the center C of the external portion of the reel body 11 on the side to which is formed the opening 22 for attaching/detaching the spool 14, around the rotational axis of the spool 14. Here, when a figure is sandwiched between two straight lines that are parallel to each other, the major axis is the line segment connecting the points where the straight lines and the figure are in contact, when the distance between the two straight lines is greatest. In FIG. 6, the major axis is the axis of symmetry of the projection of the operating element 60.

The angular range of the rotational position for selecting the braking mode of the operating element 60 is θ in the clockwise direction and φ in the counterclockwise direction with respect to the two sides of a line connecting the support shaft 52 and the center C of the external portion of the reel body 11, starting from the position in which a line extending from the support shaft 52 toward the center of the major axis faces the center C of the external portion of the reel body 11. θ and φ are respectively 90° or less. In FIG. 6, θ and φ are equal and are symmetrical, but it is not necessary that the angular range be symmetrical with respect to the line connecting the support shaft 52 and the center C of the external portion of the reel body 11.

Because the major axis of the operating element 60 is in the position where the distance between the two straight lines sandwiching the figure is greatest, the length of the operating element 60 orthogonal to the major axis is smaller than the length of the major axis. Since the angular range of the rotational position of the operating element 60 is 90° or less on each side of the line connecting the support shaft 52 and the center C of the external portion of the reel body 11, the range occupied by the turning of the operating element 60 is the range of a circle drawn by the projection of the operating element 60 centered around the support shaft 52, excluding the portions away from the center C of the external portion of the reel body 11 where the rotational position exceeds 90°. As a result, it is possible to reduce the size of the external portion of the reel on the side of the operating element 60.

In one embodiment, the external portion of the first side plate 17a is a circle, but the external portion of the reel body 11 on the side in which the opening for attaching/detaching the spool 14 is formed, around the rotational axis of the spool 14 is not limited to a circle. If the external portion is not a circle, the center of gravity of the projection of the external portion in the axial direction or the center of the major axis of the projection of the external portion in the axial direction, for example, is used as the center of the external portion.

In one embodiment, the dial plate 54 is integrally formed to include the support plate 54b, which is connected to the spool support portion 15. As a result, it is not necessary to form the pedestal for supporting the support shaft 52 in the spool support portion 15; thus, the metal mold of the spool support portion 15 can be simplified. In addition, the dial plate 54 of the mode selection unit 50 may be connected to the spool support portion 15 after assembly of the mode selection unit 50, to thereby simultaneously position the operating element 60.

The method for detecting the rotational position of the operating element 60 of the mode selection unit 50 is not limited to using the magnets 58 and the magnetic sensors 72. For example, an absolute type rotary encoder pattern may be formed on the selection element 53, and the rotational position may be identified by detecting the pattern of the reflected light. Moreover, the braking mode is not limited to five modes; four or fewer modes, or six or more modes may be used.

What is claimed is:

1. A dual-bearing reel, comprising:
a spool around which a fishing line is capable of being wound, and having a shaft;
a reel body rotatably supporting the spool, and including an opening side in which an opening is disposed through which the spool can pass in a direction of an axis of rotation of the spool;
a spool support detachably coupled to the opening side of the reel body and rotatably supporting the shaft of the spool on the opening side;
a brake configured to brake rotation of the spool; and
a mode selector disposed on the spool support and configured to select a braking mode of the brake according to a rotational position of an operating element,
the operating element is supported by a support shaft, which is biased toward one side, from a center of a major axis of a projection of the operating element in an axial direction of the spool, so as to be turnable about a position separated from a center of an external portion on the opening side of the reel body, around a rotational axis of the spool, and
the angular range of the rotational position for selecting the braking mode of the operating element is 90° or less on each side of a line connecting the support shaft and the center of the external portion, starting from a position in which a line extending from the support shaft toward the center of the major axis opposes the center of the external portion of the reel body.

2. The dual-bearing reel according to claim 1, wherein the operating element comprises
the support shaft,
a knob coupled to the support shaft, and
a selection element that opposes the knob, spaced apart in a direction of the support shaft, and that is connected to the support shaft,
the support shaft turnably supported by the spool support between the knob and the selection element.

3. The dual-bearing reel according to claim 2, wherein the mode selector
has a dial plate connected to the spool support as a separate body from the spool support and configured to indicate the braking mode that is selected according to the rotational position of the knob, and
the support shaft of the operating element is supported between the knob and the selection element by the dial plate so as to be turnable.

* * * * *